US007743418B2

(12) United States Patent
Clift et al.

(10) Patent No.: US 7,743,418 B2
(45) Date of Patent: Jun. 22, 2010

(54) IDENTIFYING MALWARE THAT EMPLOYS STEALTH TECHNIQUES

(75) Inventors: Neill Clift, Kirkland, WA (US); Thushara K. Wijeratna, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1097 days.

(21) Appl. No.: 11/263,599

(22) Filed: Oct. 31, 2005

(65) Prior Publication Data

US 2007/0101431 A1    May 3, 2007

(51) Int. Cl.
G06F 12/14 (2006.01)
G06F 7/04 (2006.01)
G08B 23/00 (2006.01)

(52) U.S. Cl. .............................. 726/24; 726/23; 726/22
(58) Field of Classification Search .................. 726/22, 726/23, 24, 25
See application file for complete search history.

(56) References Cited

U.S. PATENT DOCUMENTS 5,944,821 A * 8/1999 Angelo ........................ 726/22

* cited by examiner

*Primary Examiner*—Kambiz Zand
*Assistant Examiner*—Aubrey H Wyszynski
(74) *Attorney, Agent, or Firm*—Workman Nydegger

(57) ABSTRACT

A method, software system, and computer-readable medium are provided for determining whether a malware that implements stealth techniques is resident on a computer. In one exemplary embodiment, a method is provided that obtains a first set of data that describes the processes that are reported as being active on the computer in a non-interrupt environment. Then, the method causes program execution to be interrupted at runtime so that an analysis of the active processes on the computer may be performed. After program execution is interrupted, a second set data that describes the processes that are reported as being active on the computer in a interrupt environment is obtained. By performing a comparison between the first and second sets of data, a determination may be made regarding whether the collected data contains inconsistencies that are characteristic of malware.

20 Claims, 3 Drawing Sheets

IDENTIFYING MALWARE THAT EMPLOYS STEALTH TECHNIQUES

BACKGROUND

The constant progress of communication systems that connect computers, particularly the explosion of the Internet and intranet networks, has resulted in the development of a new information era. With a single personal computer, a user may obtain a connection to the Internet and have direct access to a wide range of resources, including electronic business applications that provide a wide range of information and services. However, as more computers have become interconnected through various networks such as the Internet, abuse by malicious computer users has also increased, particularly from invasions or attacks delivered over a network or over an information stream. As those skilled in the art will recognize, these attacks come in many different forms, including, but certainly not limited to, computer viruses, computer worms, system component replacements, spyware, adware, denial of service attacks, even misuse/abuse of legitimate computer system features, all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

Those skilled in the art and others will recognize that malware may become resident on a computer using a number of techniques. For example, a computer connected to the Internet may be attacked so that a vulnerability on the computer is exploited and the malware is delivered over the network as an information stream. By way of another example, malware may become resident on a computer using social engineering techniques. For example, a user may access a resource such as a Web site and download a program from the Web site to a local computer. While the program may be described on the Web site as providing a service desirable to the user; in actuality, the program may perform actions that are malicious.

When a malware becomes resident on a computer, the adverse results may be readily noticeable to the user, such as system devices being disabled; applications, file data, or firmware being erased or corrupted; or the computer system crashing or being unable to perform normal operations. However, some malware perform actions that are covert and not readily noticeable to the user. For example, spyware typically monitors a user's computer habits, such as Internet browsing tendencies, and transmits potentially sensitive data to another location on the network. The potentially sensitive data may be used in a number of ways, such as identifying a commercial product that matches the observed tendencies of the user. Then the spyware or an associated adware program may be used to display an advertisement to the user that promotes the identified commercial product. Since the advertisement interrupts the normal operation of the computer, the actions performed by the spyware may not be desirable to the user.

Increasingly, malware is employing stealth techniques to hide on a computer or otherwise prevent detection by programs designed to protect a computer (e.g., antivirus software, anti-spyware software, and the like). For example, malware may be distributed with a RootKit which is a type of malware that prevents the detection of other malware. Those skilled in the art and others will recognize that a RootKit acts as a "man-in-the-middle," monitoring and altering communications between an operating system and programs designed to protect a computer from malware. In this regard, if an antivirus software attempts to list the contents of a directory containing one or more files used by a malware, then the RootKit will censor the file name from the list. Similarly, a RootKit may hide entries in the system registry, process lists and the like, thereby controlling access to all of the information that the RootKit wants hidden. However, those skilled in the art and others will recognize that the functionality implemented by a RootKit may be integrated into other types of malware. Thus, the example of a RootKit is one way to implement stealth techniques for preventing detection of a malware, and this example should be construed as exemplary and not limiting.

While specific disadvantages of existing systems have been illustrated and described in this Background Section, those skilled in the art and others will recognize that the subject matter claimed herein is not limited to any specific implementation for solving any or all of the described disadvantages.

SUMMARY

Generally described, a method, software system, and computer-readable medium are provided for determining whether a malware that implements stealth techniques is resident on a computer. In one exemplary embodiment, a method is provided for obtaining a first set of data that describes the processes reported as being active on the computer in a non-interrupt environment. Then, the method causes program execution to be interrupted at runtime so that an analysis of the active processes on the computer may be performed. After program execution is interrupted, a second set data that describes the processes reported as being active on the computer in a interrupt environment is obtained. By performing a comparison between the first and second sets of data, a determination is made regarding whether the collected data contains inconsistencies that are characteristic of malware.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention may be described in the general context of computer-executable instructions, such as program modules, being executed by a computer. Generally described, program modules include routines, programs, applications, widgets, objects, components, data structures, and the like that perform particular tasks or implement particular abstract data types. The present invention may also be practiced in distributed computing environments where tasks are performed by remote processing devices that are linked through a communications network. In a distributed computing environment, program modules may be located on local and/or remote computer storage media.

While aspects of the present invention will primarily be described in the context of determining whether malware that employs stealth techniques is resident on a computer, those skilled in the relevant art and others will recognize that aspects of the invention are also applicable to other areas than those described. In any event, the following description first provides an overview of an environment and system in which aspects of the invention may be implemented. Then, a method that implements aspects of the invention is described. However, the illustrative examples provided herein are not intended to be exhaustive or to limit the claimed subject matter to the precise forms disclosed. Similarly, any steps described herein may be interchangeable with other steps or combinations of steps in order to achieve the same result.

Figure 1:
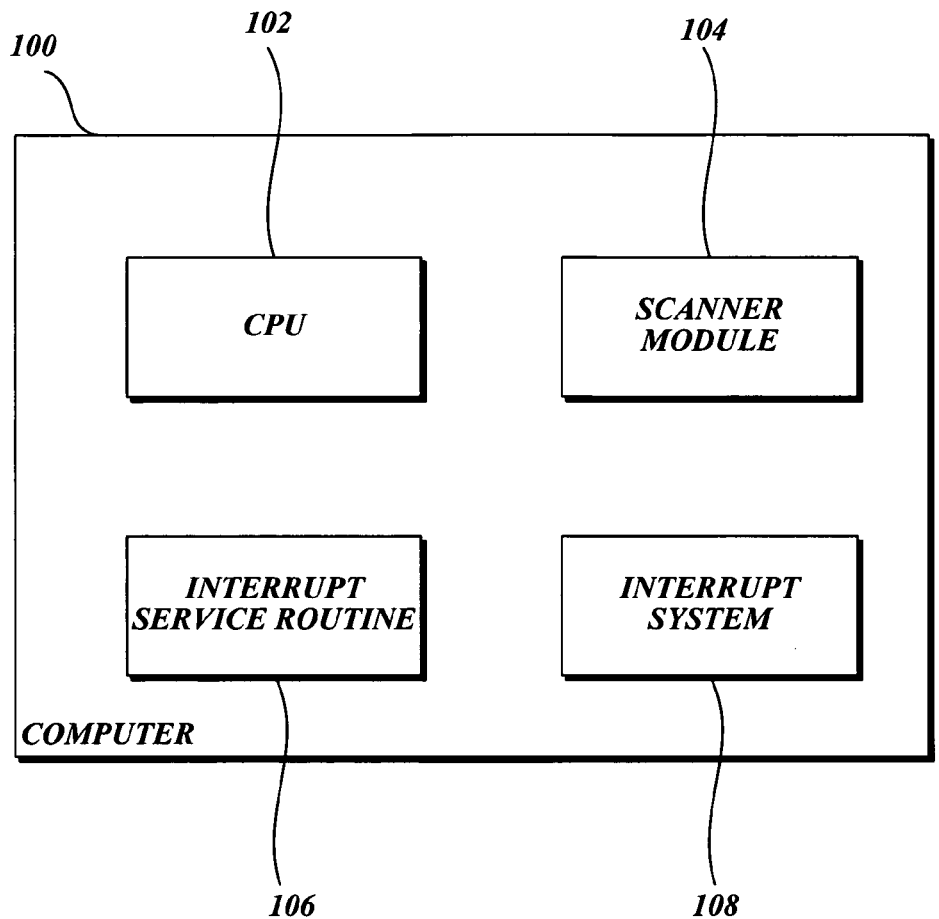
FIG. 1 is an exemplary block diagram of a computer that illustrates an environment in which aspects of the present invention may be implemented.

With reference to FIG. 1, an exemplary architecture of a computer 100 that is capable of implementing aspects of the present invention will be described. Those skilled in the art and others will recognize that the computer 100 may be any one of a variety of devices including, but not limited to, personal computing devices, server-based computing devices, mini- and mainframe computers, laptops, personal digital assistants ("PDAs"), or other electronic devices having some type of memory. For ease of illustration and because it is not important for an understanding of the present invention, FIG. 1 does not show the typical components of many computers, such as a memory, keyboard, a mouse, a printer, or other I/O devices, a display, etc. However, as illustrated in FIG. 1, the computer 100 does include a Central Processing Unit ("CPU") 102, a scanner module 104, an interrupt service routine 106, and an interrupt system 108.

As illustrated in FIG. 1, the computer 100 includes a CPU 102. Those skilled in the art and others will recognize that the CPU 102 serves as the computational center of the computer 100 by supporting the execution of instructions. Moreover, malware typically carry out their malicious functionality when malware instructions are loaded into system memory and then executed by the CPU 102. Those skilled in the art will recognize that modern operating systems schedule instructions to be executed by the CPU 102 using a multitasking scheduling algorithm in which a computer performs tasks for one or more programs at a time. As used herein, a program that is scheduled to be executed will be referred to as a "process." Moreover, when scheduled for execution, a process will have an associated set of data that is "swapped" in and out of the system memory so that instructions may be executed by the CPU. Multitasking between different processes may be performed by allocating time slices to individual processes and performing a context switch to a subsequently scheduled process when the time slice of an executing process expires. From a user's perspective multiple programs appear to execute concurrently on the same hardware resources. While the computer 100 illustrated in FIG. 1 is depicted as containing a single CPU 102, in alternative embodiments, the computer 100 may contain multiple CPUs without departing from the scope of the claimed subject matter.

Processes may become active on the computer 100 in a number of different ways. For example, a user may cause an application program to be scheduled for execution by using an input device to "double-click" on an icon associated with the application program. In response, an operating system (not illustrated) causes program code associated with the application program to be loaded from a storage device (e.g., hard drive) into system memory where the program code is accessible to the CPU 102. By way of another example, a program, such as antivirus software, may be configured to monitor all data that is incoming on the computer 100. In this instance, program code associated with the antivirus software may be loaded into system memory at computer start-up and be represented as an active process on the computer at all times. Unfortunately, a process associated with malware may also be loaded into system memory at computer start-up for the purposes of monitoring user behavior or otherwise implementing malicious functionality.

The computer 100 illustrated in FIG. 1 includes a scanner module 104 that, in one embodiment, regularly records a set of data that describes the active processes on the computer 100. As mentioned previously, modern operating systems allocate time slices to processes so that each process may cause instructions to be executed by the CPU 102. In this regard, modern operating systems maintain a number of data structures for scheduling and tracking the processes. Generally described, the scanner module 104 illustrated in FIG. 1 is a software component that causes instructions to be executed for obtaining a set of data that describes the active processes on the computer 100. In this regard, the scanner module 104 accesses data structures maintained by an operating system to obtain the set of data that describes the processes. Then, in one embodiment, the scanner module 104 causes the set of data to be stored in a location of computer memory that is accessible to the interrupt service routine 106. As described in further detail below, the interrupt service routine 106 will use the set of data obtained by the scanner module 104 to determine whether malware is resident on the computer 100.

The computer 100 illustrated in FIG. 1 includes an interrupt system 108 operative to interrupt the process that currently has access to the CPU 102. In one embodiment, the interrupt system 108 uses an Advanced Programmable Interrupt Controller ("APIC") to interrupt processes at random for the purpose of determining whether a malware that implements stealth techniques is resident on the computer 100. Those skilled in the art others will recognize that an APIC controller is a hardware device that manages interrupts on either a uniprocessor or multi-processor computer system. Since interrupts may be generated from a plurality of sources, a system for managing and prioritizing interrupts is provided in modern computers. In accordance with one embodiment of the present invention, software routines in the interrupt system 108 are configured to cause an APIC controller to interrupt process execution at random and route program execution to a location in system memory where the interrupt service routine 106 is located.

When the interrupt system 108 causes the current process to be interrupted, program execution branches to the interrupt service routine 106. The interrupt service routine 106 causes instructions to be executed for the purpose of obtaining a set of data that describes the current processes on the computer 100. Then, a comparison is made between the set of data obtained by the scanner module 104 and the set of data obtained by the interrupt service routine 106. Through this comparison, a determination is made regarding whether inconsistencies exist in the data that is indicative of a malware.

Generally stated, components of the computer 100 illustrated and described with reference to FIG. 1 provide a way to determine whether a computer is infected with a malware that implements stealth techniques to prevent detection of a malware process. In one embodiment, data that describes the active processes on the computer 100, as reported to the scanning module 104, is compared to a set of data that is obtained by the interrupt service routine 106. As mentioned previously, the scanning module 104 is executed in the normal course of computer operations in accordance with a scheduling algorithm. As a result, malware that is resident on the computer has the opportunity to censor data that is indicative of malware from being reported to the scanning module 104. Accordingly, the scanning module 104 may obtain a set of data that does not accurately identify the processes that are active on the computer 100. By contrast, the interrupt service routine 106, randomly interrupts program execution at runtime. As a result, a malware may not have the opportunity to prevent the reporting of a malware process.

FIG. 1 is a simplified example of one exemplary computer 100 with components that are capable of performing the functions of the present invention. However, actual embodiments of a computer may have additional components not illustrated in FIG. 1 or described in the accompanying text. Also, FIG. 1 shows one component architecture that may be used to implement the present invention. In this regard, for the sake of convenience, FIG. 1 illustrates a computer that contains a single central processing unit. However, the present invention may be practiced with many other computer system configurations. For example, the present invention may be practiced in a computer that contains multiple CPUs and/or other component configurations then those illustrated and described with reference to FIG. 1.

Figure 2:
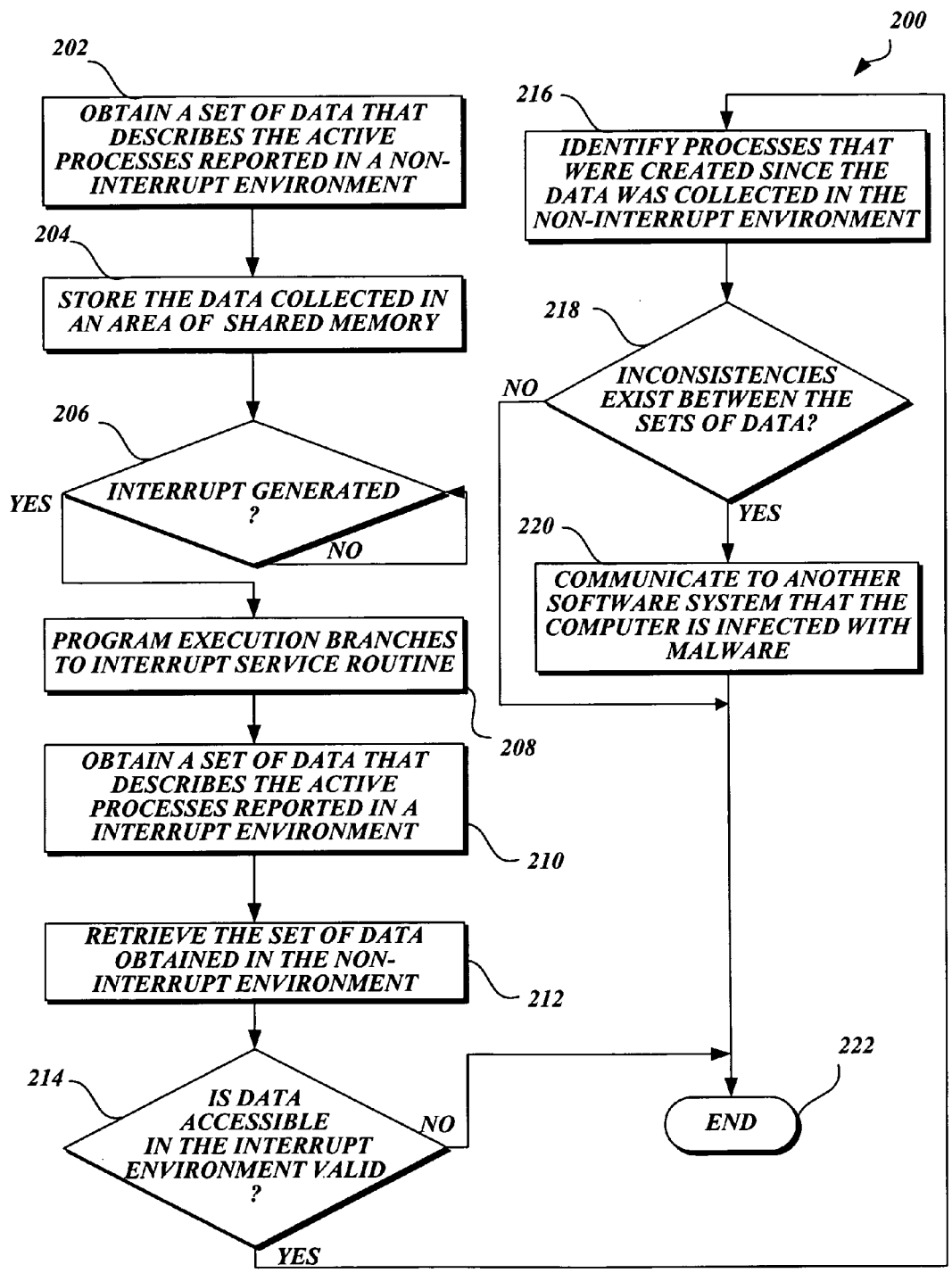
FIG. 2 is a pictorial depiction of an exemplary flow diagram for performing a method that determines whether a malware that implements stealth techniques is resident on a computer.

With reference to FIG. 2, an exemplary routine 200 for detecting malware that implements stealth techniques to prevent detection of a malware process will be described. As a preliminary matter, before the routine 200 may begin executing, an operating system is "booted" and program code (libraries, modules, etc.) that implement the routine 200 is loaded into system memory in anticipation of being executed. Those skilled in the art and others will recognize that an operating system manages the process of loading necessary program code into system memory when the program code is needed. Moreover, an operating system will also "swap" program code in and out of memory as needed to accommodate the memory requirements of programs installed on a computer.

As illustrated in FIG. 2, the routine 200 begins at block 202 where a set of data is obtained that describes the active processes on the computer. Those skilled in the art and other will recognize that modern operating systems schedule processes for execution by allocating time slices in a way that gives each process access to a CPU. At any one time, multiple processes may, and typically will, be active on a computer, obtaining access to the CPU in accordance with a scheduling algorithm. Unfortunately, a process associated with malware may also be active on a computer. As described in further detail below, at block 202, the routine 200 enumerates through areas of memory that are associated with the active processes and collects a set of data that describes the processes.

Figure 3:
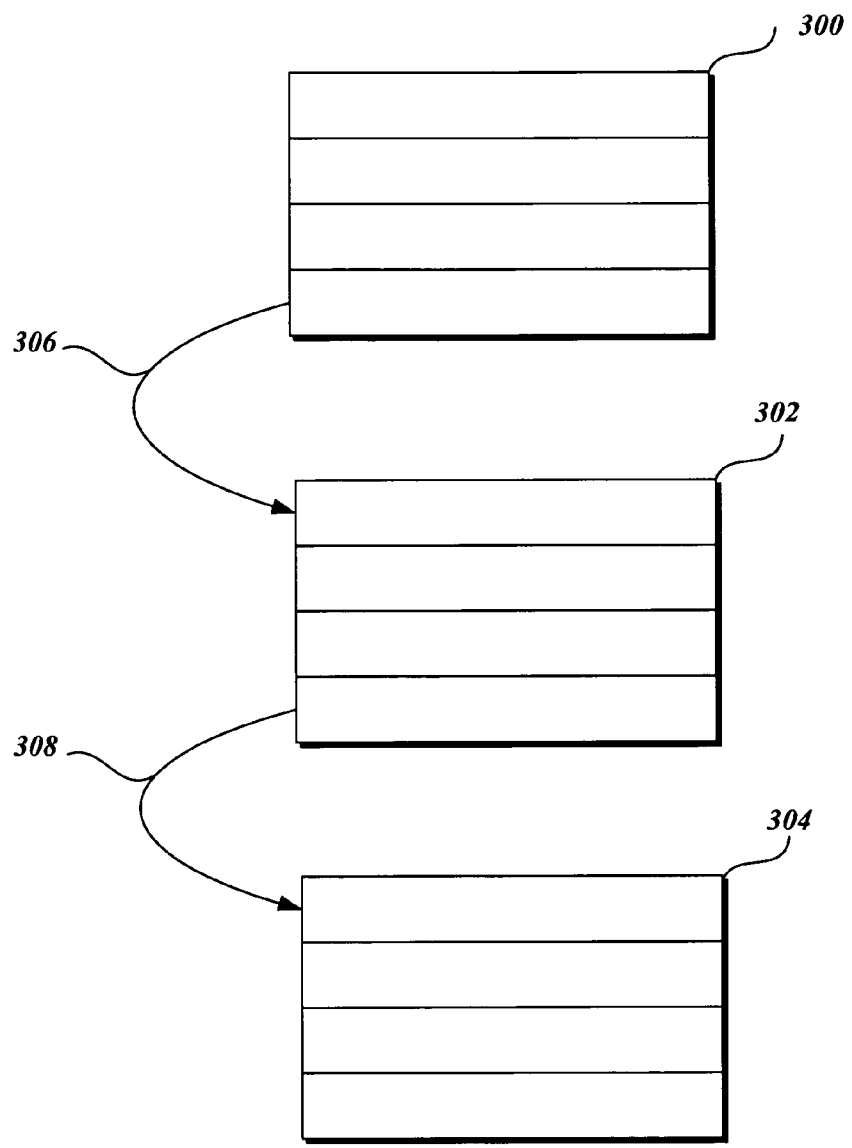
FIG. 3 is a pictorial depiction of three areas of memory associated with processes on a computer that is suitable to describe how the processes may be identified by successively referencing pointers that are contained in the areas of memory.

Now with reference to FIG. 3, areas of memory that are loaded with process data will be described for the purpose of illustrating how the routine 200 collects the set of data, at block 202. Illustrated in FIG. 3 are three areas of system memory 300, 302, and 304 that contain data allocated by a computer operating system to processes that are active on the computer. In some operating systems, an area of memory that contains data allocated to a process also contains one or more pointers to a subsequent process that is also scheduled for execution. In the context of FIG. 3, the area of memory 300 is allocated to a first process and contains a pointer 306 to the area of memory 302 that is allocated to a second process. Similarly, the area of memory 304 allocated to the second process contains a pointer 308 to the area of memory 306 that is allocated to a third process. Moreover, those skilled in the art and others will recognize that the areas of memory 300, 302, and 304 may also contain "back" pointers that reference previous processes.

Returning to FIG. 2, the routine 200 collects a set of data that describes the active processes on the computer, at block 202, by "enumerating" through the areas of memory allocated to the active processes. For example, those skilled in the art and others will recognize that the memory allocated to the process that currently has access to the CPU is stored in an operating system data structure (sometimes referred to as the "process control block"). Once the memory allocated to the current process is known, pointers to other areas of memory may be successively referenced. In one embodiment, the set of data collected at block 202 includes an identifier that is assigned by an operating system to each of the active processes. As described in further detail below, by comparing data that describes the active processes on the computer in different contexts, the routine 200 is able to identify inconsistencies that are characteristic of malware. However, those skilled in the art and others will recognize that other types of data than the exemplary data described above may be collected by the routine 200 for the purpose of determining whether a malware is resident on a computer.

In accordance with one embodiment of the present invention, when the areas of memory allocated to the active process are accessed, at block 202, a "synchronization" bit associated with each active process is set to "true." By setting a synchronization bit when data that describes an active process is obtained, the routine 200 is later able to determine whether data that describes the active processes on the computer is valid. For example, aspects of the routine 200 will interrupt program execution at runtime. As a result, the process of enumerating through the active processes, at block 202, may be interrupted before data that describes each active process is stored. As described in further detail below, in this instance, a comparison to determine whether a malware that implements stealth techniques is resident on a computer may not be safely performed.

At block 204, the routine 200 stores the data collected, at block 202, in an area of shared memory that may be accessed by a separate process such as the interrupt service routine 106 (FIG. 1). Those skilled in the art and others will recognize that one technique for performing inter-process communication includes (1) allocating an area of memory accessible to two or more processes and (2) causing one of the processes to store communication data in the allocated area of memory. When the second process is able to execute, the communication data may be accessed from the shared area of memory. In this way, two or more processes are able to share data even though the processes do not execute at the same time. However, while the routine 200 uses a shared memory location for the purpose of performing inter-process communication, those skilled in the art and others will recognize that other methods exist for performing inter-process communication and the example described here should be construed as exemplary and not limiting.

At decision block 206, the routine 200 remains idle until an interrupt is generated that will cause the flow of program execution to branch to an interrupt service routine. As described above with reference to FIG. 1, aspects of the present invention may use an interrupt system to interrupt a process that currently has access to a CPU. In one embodiment, the interrupt system is implemented using an Advanced Programmable Interrupt Controller. In this regard, the interrupt system causes an interrupt to be generated randomly when the Advanced Programmable Interrupt Controller detects a frequency on the CPU that is within a given deviation from a predetermined value. In this instance, the Advanced Programmable Interrupt Controller transmits a signal to the CPU that is designed to interrupt execution of the current process so that an interrupt service routine may be executed.

Typically, techniques for performing malware detection occur in well defined instances. For example, when an application program is scheduled to be executed, antivirus software may search for malware signatures in program code associated with the application program before the program code is executed. As a result, malware authors regularly create "patches" or software updates for previously released malware that are designed to avoid the protections provided by antivirus software. By interrupting the flow of program execution at random and searching for inconsistencies that are characteristic of malware, aspects of the present invention inhibit the efforts of malware authors in avoiding detection.

At block 208, program execution branches to an interrupt service routine such as the interrupt service routine 106 described briefly above with reference to FIG. 1. When an interrupt occurs, the CPU proceeds to a state in which the current process may be interrupted, typically by completing execution of one or more instructions. Then the state of the current process is saved and program execution branches to program code in an interrupt service routine. Moreover, those skilled in the art and others will recognize that since an interrupt is generated at runtime when a CPU is causing instructions to be executed, an interrupt service routine executes in an interrupt environment that maintains certain restrictions when compared to a non-interrupt environment. In this regard, data that is accessed in an interrupt environment may not be synchronized.

As illustrated in FIG. 2, the routine 200 collects a set of data that describes the active processes on the computer, at block 210, by "enumerating" through the areas of memory allocated to the active processes. For example, the memory allocated to the process that currently has access to the CPU is stored in an operating system data structure known as the process control block. Similar to the description provided above at block 202, once the memory allocated to the current process is known, pointers to other areas of memory may be successively referenced to enumerate through all of the processes that are active on the computer. In one embodiment, the set of data collected at block 210 includes an identifier that is assigned by an operating system to each of the active processes. Moreover, when the areas of memory allocated to the active process are accessed, at block 210, the value of the "synchronization" bit associated with each active process is identified. As described in further detail below, the values of the synchronization bits may be used to determine whether data that is accessible in the interrupt environment is valid.

At block 212, the set of data that was stored by the routine 200, at block 204, is retrieved from an area of memory that is accessible to two or more processes. As described above with reference to block 204, one technique for performing inter-process communication includes causing one process to store communication data in an area of shared memory. Then, when the second process has access to the CPU, the communication data is retrieved from the area of shared memory. In one embodiment, the first process executes in a non-interrupt environment and the second process executes in an interrupt environment. In any event, the set of data that was stored in an area of shared memory, at block 204, is retrieved at block 212 so that a comparison of the data that is obtained in different environments may be performed.

As illustrated in FIG. 2, at block 214, the routine 200 determines whether the data retrieved at block 212 that describes the active processes on the computer in the non-interrupt environment is valid. In this regard, the values of the synchronization bits identified at block 210 are used to determine whether the data that describes the active processes in a non-interrupt environment is sufficiently synchronized. For example, as mentioned previously, the routine 200 interrupts program execution at runtime. As a result, the process of enumerating through the active processes in the non-interrupt environment (at block 202) and storing data that describes the active processes in a shared memory location (at block 204) may be interrupted. In this instance, one of the processes will have a synchronization bit that is set to false thereby signifying that data collected in the non-interrupt environment is not synchronized. In this embodiment, if at least one synchronization bit associated with as a process has a value of false, a determination is made that the data obtained from the shared memory location is not valid and the routine 200 proceeds to block 222 where it terminates. Conversely, if all of the synchronization bits are set to true, a determination is made that the data that describes the processes in the non-interrupt environment is valid, and the routine 200 proceeds to block 216.

At block 216, the routine 200 identifies the processes that were created since the routine 200 stored the set of data (at block 204) that describes the processes identified in the non-interrupt environment. As mentioned previously, aspects of the present invention search for inconsistencies that are characteristic of malware by comparing data that describes processes that were identified in different contexts. To perform an accurate comparison, the processes that became active from the time the set of data was stored in the non-interrupt environment (at block 204) are identified. However, since, a computer operating system is responsible for scheduling program execution, the identity of the processes that became active from a known point in time may be obtained, at block 216, using techniques that are generally known in the art.

As illustrated in FIG. 2, at decision block 218, the routine 200 determines whether inconsistencies exist between the set of data collected in the non-interrupt environment and the set of data collected in the interrupt environment. As mentioned previously, if inconsistencies exist between the data collected, the inconsistencies may be characteristic of malware that implements stealth techniques. For example, the routine 200 records the processes that are reported as being active on the computer in the non-interrupt environment (at block 204). Then, after an interrupt has been generated, the routine 200 collects a second set of data (at block 210) that describes the processes that are reported as being active when an interrupt is randomly generated. In this regard, any malware that is resident on the computer will typically be unable to prevent the reporting of a malware process in the interrupt environment since program execution was interrupted before any stealth functionality can be implemented. Thus, if a malware process is reported to the routine 200 in the interrupt environment that was not reported in the non-interrupt environment and the process was not newly created, then stealth techniques designed to prevent detection of a malware are being performed on the computer. In any event, at block 218, the routine 200 searches for inconsistencies by determining whether a process is not being reported in the non-interrupt environment. If this type of stealth technique is detected, the routine 200 proceeds to block 220, described in further detail below. Conversely, if a stealth technique is not identified, then the routine 200 proceeds to block 222 where it terminates.

As illustrated in FIG. 2, at block 220, the routine 200 communicates to another software system that the computer is infected with a malware that performs stealth techniques. For example, aspects of the present invention may be implemented in conjunction with antivirus software. By communicating data to antivirus software, at block 220, that describes the characteristics of the identified malware, the antivirus software may be able to execute "cleaning routines" that are designed to remove or quarantine the malware from the computer. In any event, after the identification of malware is reported to software systems that are designed to remove the malware from the computer, the routine 200 proceeds to block 222, where it terminates.

The routine 200 may perform fewer/additional steps or steps in a different order than described above with reference to FIG. 2 without departing from the scope of the claimed subject matter. For example, in an alternative embodiment, the first set of data that describes the active processes on the computer may be obtained in an interrupt environment. Then, in a non-interrupt environment, a second set of data may be obtained and compared to the first set of data. Similar to the description provided above, in this embodiment, any inconsistencies identified between the data that is reported in the different environments, may be indicative of a malware infection.

While illustrative embodiments have been illustrated and described, it will be appreciated that various changes can be made therein without departing from the spirit and scope of the invention.

The embodiments of the invention in which and exclusive property or privilege is claimed are defined as follows:

1. In a computer that includes a central processing unit for executing program code and a system for interrupting program execution, a method of determining whether a malware that performs stealth techniques to prevent detection of a malware process is resident on the computer, the method comprising:
 (a) obtaining a first set of data that describes the processes that are reported as being active on the computer in a non-interrupt environment;
 (b) interrupting program execution at runtime;
 (c) obtaining a second set of data that describes the processes that are reported as being active on the computer in an interrupt environment; and
 (d) determining whether the first and second sets of data contain inconsistencies that are characteristic of malware.

2. The method as recited in claim 1, wherein an inconsistency between the first and second sets of data comprises a process that is included in the second set of data that is not included in the first set of data and that was not activated after the first set of data was obtained, the method further comprising determining that the first and second sets of data contain an inconsistency, and communicating to an existing software system that the computer is infected.

3. The method as recited in claim 1, wherein obtaining a first set of data that describes the processes that are reported as being active on the computer in a non-interrupt environment includes making the first set of data available in the interrupt environment using inter process communication.

4. The method as recited in claim 1, wherein obtaining a first set of data that describes the processes that are reported as being active on the computer in a non-interrupt environment includes storing the first set of data in a shared memory location that is accessible in the interrupt environment.

5. The method as recited in claim 1, wherein obtaining a first set of data that describes the processes that are reported as being active on the computer in a non-interrupt environment, includes:
 (a) enumerating through areas of memory that are reported as being associated with the active processes on the computer; and
 (b) collecting identifiers stored in the areas of memory that uniquely identify the processes.

6. The method as recited in claim 1, wherein the interrupting program execution is performed by an Advanced Programmable Interrupt Controller; and
 wherein program execution is interrupted at random.

7. The method as recited in claim 6, wherein causing the interrupt to occur at random includes monitoring the frequency of the central processing unit and generating the interrupt when the frequency matches a predetermined value.

8. The method as recited in claim 1, wherein interrupting program execution includes causing program execution to branch to an interrupt service routine that is located at a predetermined memory location.

9. The method as recited in claim 1, wherein obtaining a second set of data that describes the processes that are reported as being active on the computer in an interrupt environment includes:
 (a) enumerating through areas of memory that are reported as being associated with the active processes on the computer; and
 (b) collecting identifiers stored in the areas of memory that uniquely identify the processes.

10. The method as recited in claim 1, wherein determining whether the first and second sets of data contain inconsistencies that are characteristic of malware includes retrieving the first set of data from the shared memory location.

11. The method as recited in claim 1, wherein determining whether the first and second set of data contain inconsistencies that are characteristic of malware includes:
 (a) assigning synchronization bits to each active process on the computer; and
 (b) using the synchronization bits to determine whether the data accessible in the interrupt environment is synchronized with the data in the non-interrupt environment.

12. A system comprising a processor and memory that implement a software system for determining whether a malware that performs stealth techniques to prevent detection of a malware process is resident on a computer, the software system comprising:
 (a) a scanner module operative to obtain a first set of data that describes the processes that are reported as being active on the computer in a non-interrupt environment;
 (b) an interrupt system that randomly interrupts program execution at runtime and causes the flow of program execution to be directed to the interrupt service routine; and
 (c) an interrupt service routine that:
  (i) obtains a second set of data that describes the processes reported as being active on the computer in a interrupt environment; and
  (ii) determines whether the first set of data obtained by the scanner module and the second set of data have inconsistencies that are characteristic of malware.

13. The system as recited in claim 12, wherein the scanner module is regularly scheduled for program execution by a scheduling algorithm implemented in a computer operating system that allows multiple processes to share access to a central processing unit.

14. The system as recited in claim 12, wherein the interrupt system includes an Advanced Programmable Interrupt Controller that monitors the frequency of a central processing unit and causes the interrupt to be generated when the frequency of the central processing unit matches a predetermined value.

15. The system as recited in claim 12, wherein the first set of data obtained by the scanner module in the non-interrupt environment and the second set of data obtained by the interrupt service routine in the interrupt environment each contains identifiers that uniquely identify the processes that are reported as being active on the computer such that determining an inconsistency comprises detecting that the second set of data includes an identifier for a process that is not included in the first set of data, and detecting that the process was not activated after the first set of data was obtained.

16. The system as recited in claim 12, wherein the scanner module and the interrupt service routine are further configured to perform inter-process communication.

17. A computer readable medium storing computer-readable instructions which, when executed in a computer that includes a central processing unit for executing program code and a system for interrupting program execution, performs a method of determining whether a malware that performs stealth techniques to prevent detection of a malware process is resident on the computer, the method comprising:

(a) obtaining a first set of data that describes the processes that are reported as being active on the computer in a non-interrupt environment;

(b) interrupting program execution at runtime;

(c) obtaining a second set of data that describes the processes that are reported as being active on the computer in an interrupt environment; and (d) determining whether the first and second set of data contain inconsistencies that are characteristic of malware.

18. The computer readable medium as recited in claim 17 wherein obtaining a first set of data that describes the processes that are reported as being active on the computer in a non-interrupt environment includes:

(a) enumerating through areas of memory that are reported as being associated with the active processes on the computer; and (b) collecting identifiers stored in the areas of memory that uniquely identify the processes.

19. The computer readable medium as recited in claim 17, wherein interrupting program execution is performed by an Advanced Programmable Interrupt Controller; and wherein causing the interrupt to occur at random includes monitoring the frequency of the central processing unit and generating the interrupt when the frequency matches a predetermined value.

20. The computer readable medium as recited in claim 17, wherein determining whether the first and second sets of data contain inconsistencies that are characteristic of malware includes determining that a process is included in the second set of data that is not included in the first set of data and that the process was not activated after the first set of data was obtained.

* * * * *